Figure 1:
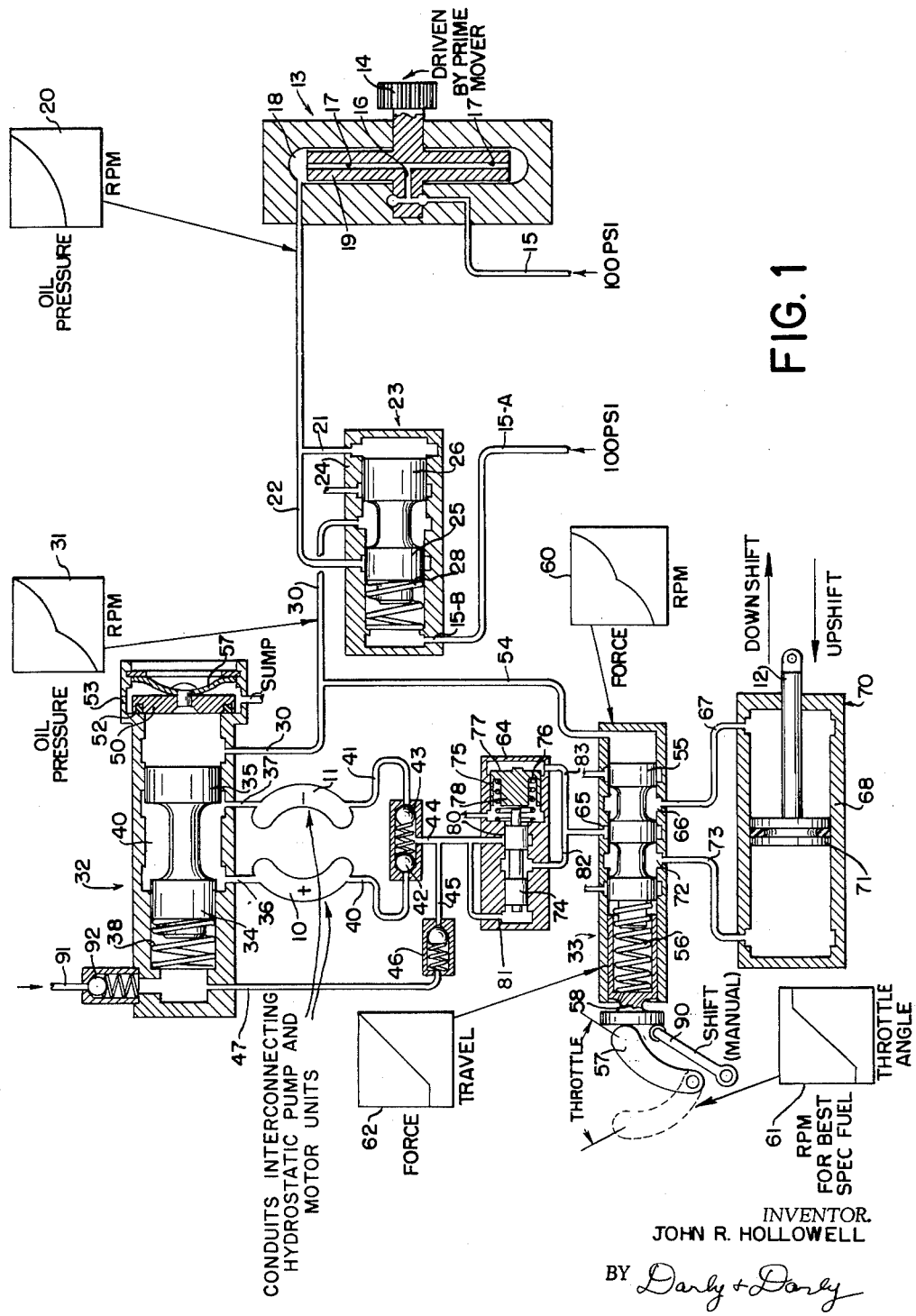

July 7, 1964   J. R. HOLLOWELL   3,139,723
CONTROL SYSTEM FOR INFINITELY VARIABLE AUTOMATIC TRANSMISSION
Filed Feb. 26, 1962   3 Sheets-Sheet 1

INVENTOR.
JOHN R. HOLLOWELL
BY Darby & Darby
ATTORNEYS

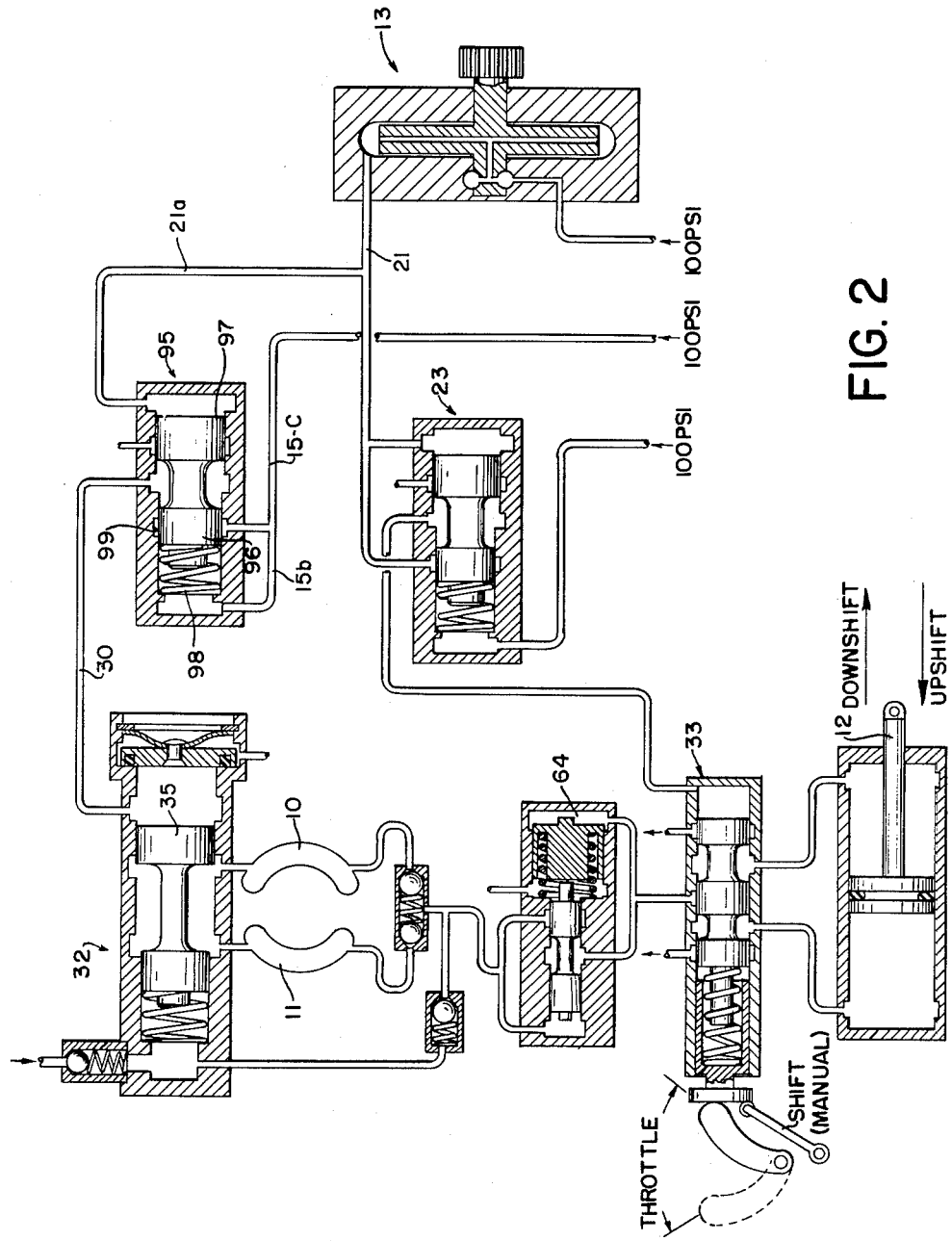

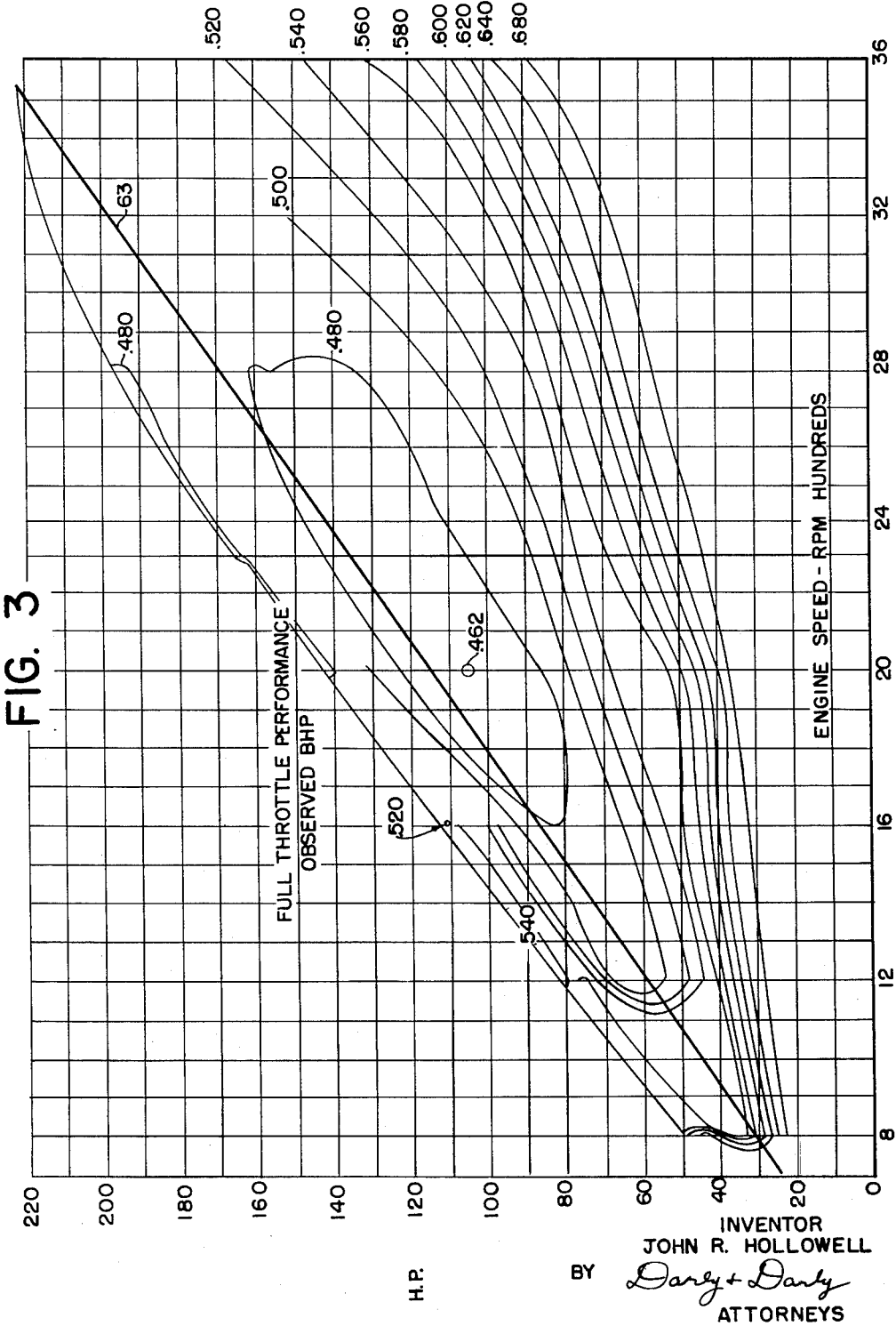

3,139,723
CONTROL SYSTEM FOR INFINITELY VARIABLE AUTOMATIC TRANSMISSION
John R. Hollowell, Dearborn, Mich., assignor to Fairchild Stratos Corporation, Hagerstown, Md., a corporation of Maryland
Filed Feb. 26, 1962, Ser. No. 175,522
17 Claims. (Cl. 60—19)

The present invention relates to control systems for infinitely variable transmissions and particularly to such control systems for infinitely variable transmissions of the hydrostatic type, effective to automatically shift the transmission to the particular ratio most suitable to the instantaneous operating condition.

The control system of the present invention comprises a centrifugal governor of the pressure type driven by the prime mover and acting through a modulating valve to develop a pressure which is effective both to control a pilot valve which in turn controls the operation of the swash plate or plates to thereby determine the ratio between the input and output shafts, and to open and close an engaging or bypass valve between the hydrostatic pump and motor units in order to effect smooth starting and stopping of the vehicle with which the transmission is used.

A particular feature of this control system is that the modulating valve is so arranged that it modifies the output pressure curve of the governor, that is the curve of output pressure plotted against governor speed, from a square law curve to a curve which is essentially a linear one. The output pressure of the modulating valve is then applied to the pilot valve in such a manner that it opposes a force proportional to throttle position thus causing the shifting function to be performed at engine speeds dependent upon the torque requirements.

As will appear, by the use of the pressure governor, modulating valve and pilot valve together with a connection between the accelerator or throttle control (the carburetor butterfly valve, in the case of an Otto engine), the prime mover is caused to operate throughout its speed range to produce the required horsepower with the lowest specific fuel consumption.

It is an object of this invention to provide a control system for a vehicular hydrostatic transmission which control system is effective to cause shifting of the continuously variable transmission to maintain the prime mover at a speed for any given throttle setting which will provide for minimum fuel consumption at the required horsepower output.

It is another object of the invention to provide such a system wherein the pressure versus speed characteristic of the pressure governor is modified by a modulating valve to produce an output from the modulating valve which has a substantially linear relationship over a speed range from idling to maximum speed to thereby assure proper operation of the pilot valve to effect shift of the transmission ratios in accordance with throttle setting, prime mover speed and load condition.

Other objects and features of the invention will be apparent when the following description is considered in connection with the annexed drawings, in which, FIGURE 1 is a diagrammatic representation of the control system of my invention. In this diagram the various components whose combined action effects the operation of the hydraulic transmission in accordance with my invention are shown in detail, but their physical incorporation into the system is shown schematically;

FIGURE 2 is a diagrammatic showing similar to FIGURE 1, but showing the use of two valves instead of the single modulating valve of FIGURE 1. With this control system the modulating valve supplies pressure to the pilot valve as in the FIGURE 1 arrangement while a separate valve supplies the engaging valve with pressures, the maximum pressure being lower than the maximum supplied from the modulating valve to the pilot valve; and FIGURE 3 is a "fuel island diagram" showing the specific fuel consumption curves for a particular engine illustrating that for each horsepower output there is a minimum specific fuel consumption point.

Referring now to the drawings, and particularly to FIGURE 1, there is shown a complete control system for a hydrostatic transmission which may be either of the tilting swash plate type or the tilting drum type. The hydrostatic pump and motor are not shown in detail, but the high and low pressure ports between the pump and motor units are indicated at 10 and 11 respectively, it being understood that when the transmission is put into reverse these ports interchange. In addition to showing the high and low pressure ports schematically, the diagram also shows at 12 an actuator for the swash plate or plates of the pump-motor unit which, as is well known, controls the angle of these plates to the shaft on which the cooperating motor or pump drum is mounted.

*Governor*

A governor generally designated 13 is provided, this governor having a shaft 14 which is driven, usually through a gear train, from the prime mover. The governor is supplied with fluid at a regulated pressure through line 15, the fluid being then conveyed through axial passageway 16 to the radially extending passageways 17. As the governor member 19 rotates, centrifugal force will build up a pressure in the chamber at the rim 18 thereof, this chamber being stationary. This pressure, as is indicated by the small diagram 20, varies with speed in accordance with a square law, the pressure however never falling below that present in the input line 15. Chamber 18 is connected by means of line 21 and line 22 to a modulating valve 23.

*Modulating Valve*

Valve 23 comprises a housing 24 having a bore of two diameters. Within the housing is a differential piston comprising a small piston member 25 mounted in the smallest diameter portion of the housing 24 and joined to a slightly larger piston member 26 mounted in the larger portion of the housing 24. Urging the piston 25–26 in a right hand direction is a spring 28 which lies within the housing 24 at the left or smallest diameter end thereof.

Line 21 feeds into the housing to the right of the piston 26. Line 22 feeds into the housing at a point closely adjacent the right hand edge of the piston member 25 when that piston is at an initial position.

In addition, a line 15A which is under a constant pressure, is connected to the housing at the left hand end through a port indicated by 15B.

As will appear, valve 23 serves to produce an output pressure in line 30 which approximates a linear curve as indicated by the small diagram designated 31. It will be noted that this approximately linear relationship between engine speed and pressure in line 30 is attained by following the upper half of the curve of diagram 20, but following a pressure reduction curve resulting from operation of valve 23 to produce a modified curve in place of the initial portion of the curve of diagram 20.

The operation of the valve 23 may best be described when a particular line pressure in line 15 is assumed. If we assume that this pressure is 100 pounds per square inch then it will be seen that when the prime mover is at rest a pressure of 100 pounds will be applied through lines 21 and 22. Line 22 is at that moment blocked due to the position of piston member 25, but line 21 applies the 100 pound pressure to the right hand side of piston 26. At the same time, through line 15A a 100 pound pressure is applied to the left hand side of piston member 25.

Assuming that the system has been operating and the various pressures built up, it will be seen that there will be pressure existing in output line 30. For the purposes of this discussion we will consider that this pressure is 40 pounds per square inch. As a result of the various pressures described, there is initially a position of the piston 25, 26 which causes the 100 pound input pressure to be reduced to approximately the 40 pound figure.

As the output pressure from the governor increases, it acts against the right hand side of piston 26 and causes further opening of the port from input line 22 thereby increasing the pressure in line 30. When the governor pressure is such as to cause movement of the piston 25, 26 to fully open the port from input line 22, then the governor pressure is applied directly to the output line 30 and the pressure in that line thereafter increases following the curve designated as 20, the composite curve of pressure in line 30 plotted against engine speed in revolutions per minute being that shown in the curve designated 31. The pressure from line 30 is applied to two valves, one the engaging or bypass valve 32 and the other the actuator pilot valve 33.

*Engaging Valve*

The engaging valve 32 is a spool valve having the differential piston members 34 and 35. This valve is connected as indicated at 36 and 37 to the high and low pressure sides of the hydrostatic pump-motor combination, the ports for which are shown at 10 and 11 as previously mentioned. In the position shown, the ports are open so that the high and low pressure sides are directly connected in which event the hydrostatic pump is not effective to drive its cooperating motor or motors. The line 30 is connected to the right of piston member 35 so that the pressure therein is effective to move the piston 34, 35 to the left against the pressure of spring 38.

In order that a rise in pressure above a predetermined amount will cause the differential piston to move to the right and open the bypass against the control pressure, the high and low pressure ports are connected by means of lines 40 and 41 to a pair of ball check valves 42 and 43. These ball check valves serve merely to assure that the high pressure is connected to a line 44. Branching from line 44 is a line 45 which, through ball check valve 46 feeds back through line 47 to the left hand side of the piston, this arrangement serving, as stated, to cause the bypass to open if the pressure in the pump-motor system exceeds the predetermined amount.

Thus as the pressure increases in line 30 the port 37 is gradually closed throttling the bypass action and placing a load on the prime mover. As this occurs, the pressure also builds up in the chamber 40 between the piston members 34 and 35 and since the area of these piston members is different this force tends to oppose the pressure in line 30 so that the action occurs gradually. However, as the pressure in line 30 continues to increase, piston 34, 35 eventually moves to the left sealing off port 37 and causing the hydrostatic pump to be in full communication with the motor or motors to transmit the full power of the prime mover through the hydrostatic transmission.

The engaging valve above-described is satisfactory for normal load fluctuations. However, if there is an inadvertent shift of the ratio control resulting in a sudden decrease in swash plate angle of a pump or motor, the working pressure will rise extremely rapidly, and this high pressure acting on the left of the piston 35 of the engaging valve will tend to cause the piston to move to the right and open the bypass valve. This piston can move only by displacing control oil back through line 30 against the control pressure from the modulating valve resulting in slow opening of the bypass. Such slow opening may permit the pressure to rise to such an extent as to do damage to the system.

*Pressure Relief Valve*

In order to prevent this, there is incorporated in the engaging valve a relief valve which consists of an additional piston 50 normally pressed by the spring diaphragm 51 into engagement with an annular shoulder 52 in the valve housing. The chamber formed between diaphragm 51 and shoulder 52 is vented through the port 53 (which may be connected to the oil sump). Thus a sudden rise in pressure causes unseating of piston 50 from its seat and relief of the undue pressure.

The particular form of combined engaging and relief valve described immediately above is not claimed in this application, but forms the subject matter of a concurrently filed application in the name of Clarence W. Laubin, Serial No. 175,523, assigned to the assignee of the instant invention.

*Pilot Valve*

As indicated hereinabove, the angle of the swash plates is automatically determined in accordance with the prime mover speed and the throttle position. The balancing of forces to achieve this result is accomplished in a pilot valve 33 which pilot valve is, as stated hereinabove, supplied with pressure fluid through a line 54 branching from the output line 30 of the modulator valve 23. The pressure exerted by the pressure fluid in line 54 at the right hand end of the spool of pilot valve 33 is effective to move the three-element spool 55 toward the right. Counteracting this pressure is the pressure of a spring 56 which is in turn compressed to a greater or lesser extent by means of the throttle control lever 57 which operates against the connecting rod 58 which, as stated, bears against the left end of spring 56. The force exerted on the right hand element of spool valve 55 follows the same curve as is indicated at 31 since this force is proportional to the pressure in output line 30 and branch 54 thereof.

The small diagram designated 60 shows force plotted against the prime mover speed in r.p.m. The force exerted on the left hand end of the spool 55 depends upon the throttle angle and, between the limits of idling and maximum speed, follows a linear relationship as shown by the small diagrams 61 and 62. As shown by diagram 61 the throttle angle is made directly proportional to the revolutions per minutes for best specific fuel consumption. This is normally accomplished by plotting a "fuel island curve" for the specific prime mover to be used. Such a curve is shown in FIGURE 3 for a particular engine.

The series of curves is well known and is arrived at by plotting the engine horsepower against the engine speed in r.p.m.'s for all settings from idling speed to maximum speed at various specific fuel consumption rates, the fuel consumption being expressed in pounds of fuel per horsepower per hour.

The series of curves thus formed and shown in FIGURE 3 indicate that a line may be drawn as shown at 63 which gives the best specific fuel consumption for each speed and horsepower. This line 63 may then be utilized to determine the throttle angle setting to produce the various speed requirements and, by properly designing the linkage between the throttle operated member 57 and the butterfly valve in the intake of the engine (not shown), the curve 61 of r.p.m. for best specific fuel consumption for each throttle position may be derived.

The curve 62 of FIGURE 1 plots the force exerted by connecting rod 58 on the valve spool 55 against the travel of the rod 58. It will be seen that this curve is substantially a replica of the r.p.m. throttle angle curve 61 so that essentially the force on the left of spool valve 55 is a straight line curve of force plotted against throttle angle. The pressure exerted on the right hand end of the spool 55 is also essentially a straight line curve of force against motor speed in revolutions per minute, the overall result being that the spool is positioned is accordance with throttle angle and engine speed.

Pilot valve 33 is utilized to effect upshifting and downshifting of the constantly variable transmission, that is, to vary the angle of the pump and/or motor swash plates to produce the required output horsepower at the wheels of the vehicle while operating the prime mover at its most efficient speed in terms of fuel consumption and at a transmission ratio which is the lowest which will satisfy the output requirement.

Shift Actuator

The pilot valve 33 is supplied with its operating pressure by means of the output line 44 from the high pressure side of the pump-motor system through a variable pressure reducing valve 64. The variable pressure reducing valve 64 will shortly be described but before describing it reference is made to the mode in which the pilot valve 33 operates to bring about shift movement of the ratio actuator.

As will be obvious, as the spool 55 of valve 33 moves to the right the port 65 communicates with port 66 thus admitting pressure fluid through line 67 to the right hand side of the housing 68 of the ratio actuator 70.

The pressure on the actuator piston 71 thereupon causes that piston to move to the left and produces an upshifting of the transmission. Conversely, when the spool 55 of pilot valve 33 moves to the right, communication is established between port 65 and port 72 thereby causing a pressure to be exerted through line 73 upon the left hand side of the piston 71 bringing about a downshift of the transmission.

Variable Pressure Reducing Valve

It is desirable to have the input pressure to the pilot valve 33 approximately proportional to the pressure existing in the high pressure side of the hydrostatic pump-motor system. At the same time it is undesirable to have the pressure in the pilot valve at as high a value as that existing in the transmission proper. I therefore utilize the variable pressure reducing valve 64 mentioned above. As will be seen from FIGURE 1, this valve is a spool valve comprising the spool member 74 operating in the usual cylinder 75 and being urged to the left by means of spring 76. Additionally, a separate piston 77 is provided, this piston operating in an enlarged bore in the right hand end of housing 75, piston 77 having a central member 78 which bears against the right hand end of spool 74. As indicated hereinabove, the pressure in line 44 is applied to the variable pressure reducing valve by means of ports 80 and 81. When the spool 74 is in the position shown in the drawing, the pressure in line 44 is exerted against the left end of the spool 74 and aids the spring 76 in moving the spool toward the right. Such movement is, however, opposed by the pressure existing in the output line 82, which output line is connected by means of the branch 83 to the chamber at the right hand end of piston 77.

Depending upon the relative areas of piston or spool 74 and piston 77, the output pressure is varied. In the particular instance shown the spool 74 has half of the end area of piston 77 and the output pressure in line 83 is approximately one-half that in the input line 44. More accurately the initial pressure in output line 44 will be determined by the value of spring 76 and the pressure on piston 77 and the output pressure will equal the initial pressure plus one-half of the supply pressure. Thus the pressure applied through the valve 64 to the pilot valve 33 bears a substantially linear relationship to the high pressure existing between the hydrostatic pump and motor being a predetermined proportion of that pressure, in the present instance, approximately one-half.

The combination of governor and valves described hereinabove renders it possible to control a hydrostatic transmission in such a manner that the prime mover operates at all times at the lowest specific fuel consumption rate as expressed in pounds of fuel per horsepower hour.

Operation of the System

In describing the operation of the control system it will be assumed that the prime mover has been in operation, the various regulated pressures established and the various valves heretofore described are in an equilibrium condition. With this assumption the operator will place the selector lever (not shown) into the automatic position and will then open the throttle in order to start the vehicle in motion. The strength of the spring 56 of the pilot valve is such that when the engine is idling the actuator is in its downshifted position. Moreover, as the accelerator pedal is operated the member 57 first moves without being followed by the throttle to increase the engine speed thus assuring that the transmission remain in this downshifted position. As the accelerator is operated beyond this point the throttle is opened causing the engine speed to increase and thereby causing the centrifugal governor 13 to produce a higher pressure in output line 21 resulting in increased pressure at the right hand end of the spool of bypass valve 32. Valve spool 34, 35 will therefore move toward the right and throttle the bypass connection between ports 10 and 11 thereby putting a load on the prime mover and preventing it from racing.

At the same time the increased pressure on the right hand end of valve spool 55 of the pilot valve will oppose the force from lever 58. However, the swash plate will remain in the downshifted position until such time as the pressure in line 54 reaches a value great enough to counterbalance the pressure from rod 58. As the pressure continues to build up in line 30 it will ultimately completely close the bypass causing engagement of the hydrostatic pump and motor thereby transmitting torque to the vehicle wheels and putting it in motion.

The throttle setting remaining the same the transmission will then operate at its maximum ratio, the prime mover increasing speed until the output from the governor 13 achieves a higher pressure value at which time the spool 55 of pilot valve 33 will move to the left causing upshifting of the transmission and maintaining the prime mover speed substantially constant while permitting the vehicle speed to increase due to the diminishing demand for output torque as the vehicle inertia is overcome. As the prime mover speed increases, the governor speed likewise increases and the transmission upshifts until a new equilibrium is established. The transmission remains in a particular ratio so long as the power demand remains constant and the throttle is maintained in the same position.

If the throttle setting is changed so that the prime mover is fed less fuel, this results in reducing the force exerted on the left end of the spool 55 of pilot valve 33. As a consequence, this valve spool moves to the left resulting in an upshifting of the transmission which results in increased engine load, decreased engine speed, proportionately decreased pressure output from the governor 13 and the modulating valve 23 and a reduction in force at the right end of the pilot valve spool 55 until an equilibrium condition is reestablished.

When the vehicle encounters an upgrade this of course loads the engine through the transmission and causes the engine speed to drop. The drop in engine speed results in decreased pressure in line 21, decreased pressure output from governor 23, and decreased pressure on the spool 55 of valve 33, thereby causing that spool to move to the right and bring about a downshifting of the transmission to maintain the engine speed corresponding to the throttle setting.

Conversely, if the vehicle encounters a downgrade the engine speed increases due to the reduction in load and the result is an upshifting of the transmission, thus maintaining the engine speed at the throttle setting but permitting increase in the vehicle speed. The upshift will of course be limited by the power requirement and therefore the engine will ultimately be loaded to an extent that equilibrium will be reestablished. In some instances, however, this may be accomplished only by use of the vehicle brake and in order to utilize the compression of the prime mover as a braking force, manual means, described hereinafter, are provided to cause downshifting of the transmission.

Manual downshifting is, however, utilized only on steep grades since the first action of the operator, if the vehicle speed rises above that desired, is to reduce the throttle setting thereby dropping the prime mover speed and thus decreasing the power output of the prime mover.

*Manual Control*

In addition to operating automatically, the transmission must also be arranged so that it can be manually controlled in order to perform certain functions which are not subject to automatic control. The structure above described is adapted to perform under these manual control conditions it being only necessary to control the admission of pressure fluid to certain of the units in order to provide these additional manually controlled functions. Such manually controlled functions are, for example, shifting of the transmission into reverse, shifting into high ratios under certain conditions of steep gradients where manual control is desirable either to assure power on upgrades or to provide a braking effect on downgrades, shifting into a neutral position so that the engine may be operated during a warm-up period (without the necessity of setting the brake to supply a torque to counteract the output torque of the transmission), shifting the transmission to a condition in which the vehicle may be towed without causing the control system to bring about automatic shifting of the transmission, and placing the system into condition to start the prime mover by pushing the vehicle.

Shifting into reverse is accomplished in any desired manner as for example by utilizing a common form of double piston arrangement in place of the single piston shifting mechanism 12. By means of such a double piston arrangement, together with a separate fluid pressure line, the swash plate angle of either the pump or motor is caused to become negative and power is transmitted in the reverse direction.

The transmission may be shifted into a manual low position by means of the shift lever 90 (FIG. 1) which causes movement toward the right of the valve spool 55 of pilot valve 33 while the throttle is closed. Lever 90, as is apparent from the drawing, acts against the rod 58 of pilot valve 33 independently of the throttle actuator 57 so that the force on the left end of the valve spool 55 is increased and the transmission thereby caused to downshift despite the relatively high speed and pressure output of the governor 13. This results in permitting the engine to function at a higher speed than when the control lever is in "automatic" position and is a condition similar to a low gear of a regular vehicle gear box. In the same manner as is true of a manual low gear, this position may be utilized either to produce a greater torque as is required for example in moving ahead slowly with maximum power or to permit use of the prime mover compression as a braking force when going down steep grades.

In order to shift the transmission into a neutral position so that the engine may be operated during a warm-up period, manually operated means are provided to increase the pressure on the left end of spool 34, 35 of the engaging or bypass valve 40. These manually operated means (not shown) cause a regulated pressure to be applied to line 91 which pressure, through a ball check valve 92, is applied to the piston member 34. As a result, the engaging valve is caused to move to the right connecting the high and low pressure ports 10 and 11 and preventing the interconnection of the hydrostatic pump and motor. As a result, the prime mover may idle without effect insofar as the vehicle movement is concerned.

The transmission is placed in condition for a towing operation by pressurizing the line 91 as indicated above for warm-up thereby assuring that the transmission will not transmit power to the prime mover from the wheels. At the same time, for tow operation the regulated pressure is removed from line 15A thereby increasing the output pressure in line 30 which will now be the line pressure applied through line 15 to the governor and through lines 21, 30 and 54 to the pilot valve. As a result the transmission will be upshifted which is required under towing conditions.

In order to enable the prime mover to be started by pushing the vehicle, an auxiliary pump is provided in the usual manner which pump is driven from the output shaft. The pressure from this pump is applied through manually controlled valves to the right hand side of the bypass or engagement valve piston 34, 35 and to the right hand side of the pilot valve piston 55 thus causing the bypass valve to close and the shift actuator 70 to cause upshifting of the transmission. As a result the hydrostatic motor operating as a pump causes the pump to operate as a motor and drive the prime mover. At the same time the step down ratio is adjusted to 1:1 or as nearly that figure as is attainable so that the prime mover is driven at a relatively high rate of speed and can thus be started. The pressure applied to the pilot valve is sufficiently high so that the throttle may be somewhat opened to thereby assure sufficient fuel fed to the prime mover to enable the cranking action to cause it to start.

*Modified Modulator Valve Arrangement*

A modification of the control system of FIG. 1 is shown in FIG. 2. This modification consists in utilizing the modulating valve 23 solely to supply fluid pressure to the pilot valve 33 and utilizing an independent valve 95 for controlling the operation of the bypass or engaging valve 40. Valve 95 is the same as valve 23 except for hook up of hydraulic lines. Pressure from the governor 13 is supplied over line 21 and 21a to the right hand side of the valve chamber and tends to urge the spool 96, 97 to the left, this movement being resisted by the spring 98. A regulated pressure is supplied adjacent the left hand end of the valve over the line 15b the pressure being the same as that supplied to the modulator valve 23 as hereinbefore described. The output of valve 95 is fed over a line 30 to the right hand side of the piston member 35 of valve 32.

When the modified arrangement just above described is utilized the pressure in line 30 never exceeds the regulated pressure supplied over line 15c and varies between zero and that regulated pressure. Thus as the prime mover speed increases, pressure in line 21a increases and the spool of valve 95 is moved to the left. As it moves the piston member 96 uncovers the port 99 and pressure fluid is supplied through line 30 to the bypass valve 32, the pressure being dependent upon the amount of movement of the spool 96, 97. The arrangement of FIG. 2 provides a lower operating pressure for valve 32 than does that of FIG. 1 which is advantageous in some situations since the maximum pressure is limited. This in turn limits the maximum operating pressure of the transmission to a value lower than would be allowed with the higher pressure output of valve 23.

In all other respects the control system of FIG. 2 is identical with that of FIG. 1 and it is believed therefore needs no further description either as to its structural arrangement or its operation.

While I have described a preferred embodiment of the invention, it will be understood that I wish to be limited not by the foregoing description, but solely by the claims granted to me.

What is claimed is:

1. In a control system for an infinitely variable hydrostatic transmission of the type having a pump and motor with interconnecting fluid pressure and return conduits, and an associated prime mover, in combination, a centrifugal pressure governor driven by the prime mover at a speed directly proportional to the prime mover speed, said governor serving to produce an output pressure which varies as the square of speed from a minimum equal to a regulated pressure supply to a maximum, a modulating valve connected to the output of said governor, said modulating valve producing a pressure output substantially linear with respect to prime mover speed from idling speed to the prime mover maximum, a pilot valve for determining the ratio setting of the transmission, means applying the output pressure from said modulating valve to said pilot valve to urge said pilot valve to position to effect shifting of the ratio in one direction and means applying a pressure proportional to prime mover throttle setting to urge said pilot valve in the opposite direction to a position to effect shifting of the transmission ratio in the opposite direction.

2. In a control system for an infinitely variable hydrostatic transmission of the type having a pump and motor with interconnecting fluid pressure and return conduits, and an associated prime mover, in combination, a centrifugal pressure governor driven by the prime mover at a speed directly proportional to the prime mover speed, said governor serving to produce an output pressure which varies as the square of speed from a minimum equal to a regulated pressure supply to a maximum, a modulating valve of the spool type, means connecting the output of said governor to said modulating valve to cause movement of the spool thereof against a resisting force, means also connecting said governor output to a port closed by the modulating valve spool when said governor output pressure is below a predetermined value, an output line communicating with said port when the valve spool moves to an end position, said port being opened as said spool moves with increasing governor pressure thereby gradually increasing the pressure in said output line from a minimum value to a value corresponding to full open condition of said port, said port being thereafter fully open and the pressure in said output line being that of the governor output, a pilot valve for determining the ratio setting of the transmission, means applying the output pressure from said modulating valve to said pilot valve to urge said pilot valve to position to effect shifting of the ratio in one direction and means applying a pressure proportional to prime mover throttle setting to urge said pilot valve in the opposite direction to a position to effect shifting of the transmission ratio in the opposite direction.

3. In a control system for an infinitely variable hydrostatic transmission, of the type having a hydrostatic pump and motor together with interconnecting fluid pressure and return conduits, and an associated prime mover, in combination, a centrifugal pressure governor driven at a speed directly proportional to the prime mover, said governor producing an output pressure which varies as the square of governor speed between a minimum equal to the pressure of a regulated supply to said governor and a maximum, a modulating valve connected to the output of said governor, said modulating valve producing a pressure output which varies substantially linearly with prime mover speed, a pilot valve for determining the ratio setting of the infinitely variable transmission, means applying the output pressure from said modulating valve to said pilot valve to move said pilot valve toward position for effecting change of ratio of transmission in one direction and means applying a force directly proportional to the prime mover throttle setting for best specific fuel consumption to said pilot valve to oppose said modulating valve output pressure and to urge said pilot valve toward position to effect shifting of the transmission ratio in the opposite direction whereby the transmission ratio is always set at a value to produce the required horsepower output for the particular throttle setting with the minimum specific fuel consumption.

4. In a control system for an infinitely variable hydrostatic transmission, of the type having a hydrostatic pump and motor together with interconnecting fluid pressure and return conduits, and an associated prime mover, in combination, a centrifugal pressure governor driven at a speed directly proportional to the prime mover, said governor producing an output pressure which varies as the square of governor speed between a minimum equal to the pressure of a regulated supply to said governor and a maximum, a modulating valve of the spool type, means connecting the output of said governor to said modulating valve to cause movement of the spool thereof against a resisting force, means also connecting said governor output to a port closed by the modulating valve spool when said governor output pressure is below a predetermined value, an output line communicating with said port when the valve spool moves to an end position, said port being opened as said spool moves with increasing governor pressure thereby gradually increasing the pressure in said output line from a minimum value to a value corresponding to full open condition of said port, said port being thereafter fully open and the pressure in said output line being that of the governor output, a pilot valve for determining setting of the infinitely variable transmission, means applying the output pressure from said modulating valve to said pilot valve to move said pilot valve toward position for effecting change of ratio of transmission in one direction and means applying a force directly proportional to the prime mover throttle setting for best specific fuel consumption to said pilot valve to oppose said modulating valve output pressure and to urge said pilot valve toward position to effect shifting of the transmission ratio in the opposite direction whereby the transmission ratio is always set at a value to produce the required horsepower output for the particular throttle setting with the minimum specific fuel consumption.

5. In a control system for an infinitely variable hydrostatic transmission, of the type having a hydrostatic pump and motor together with interconnecting fluid pressure and return conduits, and an associated prime mover, in combination, a centrifugal pressure governor driven at a speed directly proportional to the prime mover, said governor producing an output pressure which varies as the square of governor speed between a minimum equal to the pressure of a regulated supply to said governor and a maximum, a modulating valve connected to the output of said governor, said modulating valve producing a pressure output which varies substantially linearly with prime mover speed, a pilot valve for determining the ratio setting with the infinitely variable transmission, means applying the output pressure from said modulating valve to said pilot valve to move said pilot valve toward position for effecting change of ratio of transmission in one direction, means applying a force directly proportional to the prime mover throttle setting for best specific fuel consumption to said pilot valve to oppose said modulating valve output pressure and to urge said pilot valve toward position to effect shifting of the transmission ratio in the opposite direction whereby the transmission ratio is always set at a value to produce the required horsepower output for the particular throttle setting with the minimum specific fuel consumption, a bypass valve for interconnecting the pressure and return conduits of the hydrostatic pump and motor and means applying the pressure fluid output of said modulating valve to said bypass valve to position said bypass valve to cause gradual closing thereof whereby the hydrostatic motor is gradually operatively connected to the pump producing smooth take-up of load by the prime mover.

6. In a control system for an infinitely variable hydrostatic transmission, of the type having a hydrostatic pump and motor together with interconnecting fluid pressure and return conduits, and an associated prime mover, in combination, a centrifugal pressure governor driven at a speed directly proportional to the prime mover, said governor producing an output pressure which varies as the square of governor speed between a minimum equal to the pressure of a regulated supply to said governor and a maximum, a modulating valve of the spool type, means connecting the output of said governor to said modulating valve to cause movement of the spool thereof against a resisting force, means also connecting said governor output to a port closed by the modulating valve spool when said governor output pressure is below a predetermined value, an output line communicating with said port when the valve spool moves to an end position, said port being opened as said spool moves with increasing governor pressure thereby gradually increasing the pressure in said output line from a minimum value to a value corresponding to full open condition of said port, said port being thereafter fully open and the pressure in said output line being that of the governor output, a pilot valve for determining the ratio setting with the infinitely variable transmission, means applying the output pressure from said modulating valve to said pilot valve to move pilot valve toward position for effecting change of ratio of transmission in one direction, means applying a force directly proportional to the prime mover throttle setting for best specific fuel consumption to said pilot valve to oppose said modulating valve output pressure and to urge said pilot valve toward position to effect shifting of the transmission ratio in the opposite direction whereby the transmission ratio is always set at a value to produce the required horsepower output for the particular throttle setting with the minimum specific fuel consumption, a bypass valve for interconnecting the pressure and return conduits of the hydrostatic pump and motor and means applying the pressure fluid output of said modulating valve to said bypass valve to position said bypass valve to cause gradual closing thereof whereby the hydrostatic motor is gradually operatively connected to the pump producing smooth take-up of load by the prime mover.

7. In a control system for an infinitely variable hydrostatic transmission, of the type having a hydrostatic pump and motor together with interconnecting fluid pressure and return conduits, and an associated prime mover, in combination, a centrifugal pressure governor driven at a speed directly proportional to the prime mover, said governor comprising a drum driven by the prime mover, said drum having interconnecting axial and radial passageways therein, a stationary housing surrounding said drum, said housing having a chamber formed therein at the periphery of said drum, means supplying pressure fluid at a regulated pressure to said axial passage and to said radial passages, said governor having an outlet from said housing chamber, pressure in said outlet varying as the square of prime mover speed between a minimum equal to that of the regulated supply thereto and a maximum, a modulating valve connected to the output of said governor, said modulating valve producing a pressure output which varies substantially linearly with prime mover speed, a pilot valve for determining the ratio setting of the infinitely variable transmission, means applying the output pressure from said modulating valve to said pilot valve to move said pilot valve toward position for effecting change of ratio of transmission in one direction, and means applying a force directly proportional to the prime mover throttle setting for best specific fuel consumption to said pilot valve to oppose said modulating valve output pressure and to urge said pilot valve toward position to effect shifting of the transmission ratio in the opposite direction whereby the transmission ratio is always set at a value to produce the required horsepower output for the particular throttle setting with the minimum specific fuel consumption.

8. In a control system for an infinitely variable hydrostatic transmission, of the type having a hydrostatic pump and motor together with interconnecting fluid pressure and return conduits, and an associated prime mover, in combination, a centrifugal pressure governor driven at a speed directly proportional to the prime mover, said governor comprising a drum driven by the prime mover, said drum having interconnecting axial and radial passageways therein, a stationary housing surrounding said drum, said housing having a chamber formed therein at the periphery of said drum, means supplying pressure fluid at a regulated pressure to said axial passage and to said radial passages, said governor having an outlet from said housing chamber, pressure in said outlet varying as the square of prime mover speed between a minimum equal to that of the regulated supply thereto and a maximum, a modulating valve of the spool type, means connecting the output of said governor to said modulating valve to cause movement of the spool thereof against a resisting force, means also connecting said governor output to a port closed by the modulating valve spool when said governor output pressure is below a predetermined value, an output line communicating with said port when the valve spool moves to an end position, said port being opened as said spool moves with increasing governor pressure thereby gradually increasing the pressure in said output line from a minimum value to a value corresponding to full open condition of said port, said port being thereafter fully open and the pressure in said output line being that of the governor output, a pilot valve for determining the ratio setting of the infinitely variable transmission, means applying the output pressure from said modulating valve to said pilot valve to move said pilot valve toward position for effecting change of ratio of transmission in one direction, and means applying a force directly proportional to the prime mover throttle setting for best specific fuel consumption to said pilot valve to oppose said modulating valve output pressure and to urge said pilot valve toward position to effect shifting of the transmission ratio in the opposite direction whereby the transmission ratio is always set at a value to produce the required horsepower output for the particular throttle setting with the minimum specific fuel consumption.

9. In a control system for an infinitely variable hydrostatic transmission, of the type having a hydrostatic pump and motor together with interconnecting fluid pressure and return conduits, and an associated prime mover, in combination, a centrifugal pressure governor driven at a speed directly proportional to the prime mover, said governor producing an output pressure which varies as the square of governor speed between a minimum equal to the pressure of a regulated supply to said governor and a maximum, a modulating valve connected to the output of said governor, said modulating valve comprising a housing having bores of two diameters, a valve spool operable in said housing and having piston members of two diameters corresponding to the bore diameters, spring means for urging said spool in one direction, means connecting a source of regulated pressure fluid to urge said spool in the same direction as said spring, means connecting the output from said centrifugal pressure governor to the opposite side of said last mentioned piston member to urge said spool in a direction opposing said spring urge, means connecting said governor output to said valve housing at a location to be throttled by said smaller diameter piston member as said spool moves in response to increase of pressure in said first mentioned governor output line, and an output port in said housing between said smaller and larger diameter piston members whereby the output pressure from said modulating valve varies substantially linearly with prime mover speed between a minimum corresponding to the idling speed of the prime mover and a maximum corresponding to the maximum speed thereof, a pilot valve for determining the ratio setting of the infinitely variable transmission, means applying the output pressure from said modulating valve to said pilot valve to move said pilot valve toward position for effecting change of ratio of transmission in one direction and means applying a force directly proportional to the prime mover throttle setting for best specific fuel consumption to said pilot valve to oppose said modulating valve output pressure and to urge said pilot valve toward position to effect shifting of the transmission ratio in the opposite direction whereby the transmission ratio is always set at a value to produce the required horsepower output for the particular throttle setting with the minimum specific fuel consumption.

10. In a control system for an infinitely variable hydrostatic transmission, of the type having a hydrostatic pump and motor together with interconnecting fluid pressure and return conduits, and an associated prime mover, in combination, a centrifugal pressure governor driven at a speed directly proportional to the prime mover, said governor comprising a drum driven by the prime mover, said drum having interconnecting axial and radial passageways therein, a stationary housing surrounding said drum, said housing having a chamber formed therein at the periphery of said drum, means supplying pressure fluid at a regulated pressure to said axial passage and to said radial passages, said governor having an outlet from said housing chamber, pressure in said outlet varying as the square of prime mover speed between a minimum equal to that of the regulated supply thereto and a maximum, a modulating valve connected to the output of said governor, a pilot valve for determining the ratio setting of the infinitely variable transmission, means applying the output pressure from said modulating valve to said pilot valve to move said pilot valve toward position for effecting change of ratio of transmission in one direction, means applying a force directly proportional to the prime mover throttle setting for best specific fuel consumption to said pilot valve to oppose said modulating valve output pressure and to urge said pilot valve toward position to effect shifting of the transmission ratio in the opposite direction whereby the transmission ratio is always set at a value to produce the required horsepower output for the particular throttle setting with the minimum specific fuel consumption, a bypass valve for interconnecting the pressure and return conduits of the hydraulic pump and motor and means applying the pressure fluid output of said modulating valve to said bypass valve to position said bypass valve to cause gradual closing thereof whereby the hydrostatic motor is gradually operatively connected to the pump producing smooth take-up of load by the prime mover.

11. In a control system for an infinitely variable hydrostatic transmission, of the type having a hydrostatic pump and motor together with interconnecting fluid pressure and return conduits, and an associated prime mover, in combination, a centrifugal pressure governor driven at a speed directly proportional to the prime mover, said governor producing an output pressure which varies as the square of governor speed between a minimum equal to the pressure of a regulated supply to said governor and a maximum, a modulating valve connected to the output of said governor, said modulating valve comprising a housing having bores of two diameters, a valve spool operable in said housing and having piston members of two diameters corresponding to the bore diameters, spring means for urging said spool in one direction, means connecting a source of regulated pressure fluid to urge said spool in the same direction as said spring, means connecting the output from said centrifugal pressure governor to the opposite side of said last mentioned piston member to urge said spool in a direction opposing said spring urge, means connecting said governor output to said valve housing at a location to be throttle by said smaller diameter piston member as said spool moves in response to and increase of pressure in said first mentioned governor output line, and an output port in said housing between said smaller and larger diameter piston members whereby the output pressure from said modulating valve varies substantially linearly with prime mover speed between a minimum corresponding to the idling speed of the prime mover and a maximum corresponding to the maximum speed thereof, a pilot valve for determining the ratio setting of the infinitely variable transmission, means applying the output pressure from said modulating valve to said pilot valve to move said pilot valve toward position for effecting change of ratio of transmission in one direction, means applying a force directly proportional to the prime mover throttle setting for best specific fuel consumption to said pilot valve to oppose said modulating valve output pressure and to urge said pilot valve toward position to effect shifting of the transmission ratio in the opposite direction whereby the transmission ratio is always set at a value to produce the required horsepower output for the particular throttle setting with the minimum specific fuel consumption, a bypass valve for interconnecting the pressure and return conduits of the hydraulic pump and motor and means applying the pressure fluid output of said modulating valve to said bypass valve to position said bypass valve to cause gradual closing thereof whereby the hydrostatic motor is gradually operatively connected to the pump producing smooth take-up of load by the prime mover.

12. In a control system for an infinitely variable hydrostatic transmission, of the type having a hydrostatic pump and motor together with interconnecting fluid pressure and return conduits, and an associated prime mover, in combination, a centrifugal pressure governor driven at a speed directly proportional to the prime mover, said governor comprising a drum driven by the prime mover, said drum having interconnecting axial and radial passageways therein, a stationary housing surrounding said drum, said housing having a chamber formed therein at the periphery of said drum, means supplying pressure fluid at a regulated pressure to said axial passage and to said radial passages, said governor having an outlet from said housing chamber, pressure in said outlet varying as the square of prime mover speed between a minimum equal to that of the regulated supply thereto and a maximum, a modulating valve connected to the output of said governor, said modulating valve comprising a housing having bores of two diameters, a valve spool operable in said housing and having piston members of two diameters corresponding to the bore diameters, spring means for urging said spool in one direction, means connecting a source of regulated pressure fluid to urge said spool in the same direction as said spring, means connecting the output from said centrifugal pressure governor to the opposite side of said last mentioned piston member to urge said spool in a direction opposing said spring urge, means connecting said governor output to said valve housing at a location to be throttled by said smaller diameter piston member as said spool moves in response to increase of pressure in said first mentioned governor output line, and an output port in said housing between said smaller and larger diameter piston members whereby the output pressure from said modulating valve varies substantially linearly with prime mover speed between a minimum corresponding to the idling speed of the prime mover and a maximum corresponding to the maximum speed thereof, a pilot valve for determining the ratio setting of the infinitely variable transmission, means applying the output pressure from said modulating valve to said pilot valve to move said pilot valve toward position for effecting change of ratio of transmission in one direction, means applying a force directly proportional to the prime mover throttle setting for best specific fuel consumption to said pilot valve to oppose said modulating valve output pressure and to urge said pilot valve toward position to effect shifting of the transmission ratio in the opposite direction whereby the transmission ratio is always set at a value to produce the required horsepower output for the particular throttle setting with the minimum specific fuel consumption.

13. In a control system for an infinitely variable hydrostatic transmission, of the type having a hydrostatic pump and motor together with interconnecting fluid pressure and return conduits, and an associated prime mover, in combination, a centrifugal pressure governor driven at a speed directly proportional to the prime mover speed, said governor comprising a drum driven by the prime mover, said drum having interconnecting axial and radial passageways therein, a stationary housing surrounding said drum, said housing having a chamber formed therein at the periphery of said drum, means supplying pressure fluid at a regulated pressure to said axial passage and to said radial passages, said governor having an outlet from said housing chamber, pressure in said outlet varying as the square of prime mover speed between a minimum equal to that of the regulated supply thereto and a maximum, a modulating valve connected to the output of said governor, said modulating valve comprising a housing having bores of two diameters, a valve spool operable in said housing and having piston members of two diameters corresponding to the bore diameters, spring means for urging said spool in one direction, means connecting a source of regulated pressure fluid to urge said spool in the same direction as said spring, means connecting the output from said centrifugal pressure governor to the opposite side of said last mentioned piston member to urge said spool in a direction opposing said spring urge, means connecting said governor output to said valve housing at a location to be throttled by said smaller diameter piston member as said spool moves in response to increase of pressure in said first mentioned governor output line, and an output port in said housing between said smaller and larger diameter piston members whereby the output pressure from said modulating valve varies substantially linearly with prime mover speed between a minimum corresponding to the idling speed of the prime mover and a maximum corresponding to the maximum speed thereof, a pilot valve for determining the ratio setting of the infinitely variable transmission, means applying the output pressure from said modulating valve to said pilot valve to move said pilot valve toward position for effecting change of ratio of transmission in one direction, means applying a force directly proportional to the prime mover throttle setting for best specific fuel consumption to said pilot valve to oppose said modulating valve output pressure and to urge said pilot valve toward position to effect shifting of the transmission ratio in the opposite direction whereby the transmission ratio is always set at a value to produce the required horsepower output for the particular throttle setting with the minimum specific fuel consumption, a bypass valve for interconnecting the pressure and return conduits of the hydraulic pump and motor and means applying the pressure fluid output of said modulating valve to said bypass valve to cause gradual to position said bypass valve to cause gradual closing thereof whereby the hydrostatic motor is gradually operatively connected to the pump producing smooth take-up of load by the prime mover.

14. In a control system for an infinitely variable hydrostatic transmission of the type having a pump and motor with interconnecting fluid pressure and return conduits, and an associated prime mover, in combination, a centrifugal pressure governor driven by the prime mover at a speed directly proportional to the prime mover speed, said governor serving to produce an output pressure which varies as the square of speed from a minimum equal to a regulated pressure supply to a maximum, a modulating valve connected to the output of said governor, said modulating valve producing a pressure output substantially linear with respect to prime mover speed from idling speed to the prime mover maximum, a pilot valve of the spool type for determining the ratio setting of the transmission, means applying the output pressure from said modulating valve to said pilot valve to urge the spool thereof in one direction, means applying a pressure proportional to prime mover throttle setting to said pilot valve spool to urge said spool in the opposite direction, a transmission ratio shifting means comprising a cylinder and piston therein and means applying a pressure proportional to the pressure in the hydrostatic pump and motor conduits to a selected side of said piston to thereby shift said ratio in a direction dependent upon the position of said pilot valve spool.

15. A control system in accordance with claim 14 wherein said means for applying a pressure proportional to the hydrostatic pump and motor conduit pressure comprises a variable pressure regulating valve.

16. In a control system for an infinitely variable hydrostatic transmission of the type having a pump and motor unit with interconnecting fluid pressure and return conduits, and an associated prime mover, in combination, a centrifugal pressure governor driven by the prime mover at a speed directly proportional to the prime mover speed, said governor serving to produce an output pressure which varies as the square of speed from a minimum equal to a regulated pressure supply to a maximum, a modulating valve connected to the output of said governor, said modulating valve producing a pressure output substantially linear with respect to prime mover speed from idling speed to the prime mover maximum, a pilot valve of the spool type for determining the ratio setting of the transmission, means applying the output pressure from said modulating valve to said pilot valve to urge said pilot valve to position to effect shifting of the ratio in one direction, means applying a pressure proportional to prime mover throttle setting to urge said pilot valve in the opposite direction to position to effect shifting of the transmission ratio in the opposite direction, a bypass valve for interconnecting the pressure and return conduits of the hydrostatic pump and motor unit, a pressure amplifying valve, means connecting the pressure output of said governor to the input of said amplifying valve, and means connecting the output of said amplifying valve to said bypass valve to thereby cause said bypass valve to operate to gradually close whereby the hydrostatic motor is gradually operatively connected to the pump producing smooth take-up of load by the prime mover.

17. In a control system for an infinitely variable hydrostatic transmission of the type having a pump and motor unit with interconnecting fluid pressure and return conduits, and an associated prime mover, in combination, a centrifugal pressure governor driven by the prime mover at a speed directly proportional to the prime mover speed, said governor serving to produce an output pressure which varies as the square of speed from a minimum equal to a regulated pressure supply to a maximum, a modulating valve of the spool type, means connecting the output of said governor to said modulating valve to cause movement of the spool thereof against a resisting force, means also connecting said governor output to a port closed by the modulating valve spool when said governor output pressure is below a predetermined value, an output line communicating with said port when the valve spool moves to an end position, said port being opened as said spool moves with increasing governor pressure thereby gradually increasing the pressure in said output line from a minimum value to a value corresponding to full open condition of said port, said port being thereafter fully open and the pressure in said output line being that of the governor output, a pilot valve for determining the ratio setting of the transmission, means applying the output pressure from said modulating valve to said pilot valve to urge said pilot valve to position to effect shifting of the ratio in one direction, means applying a pressure proportional to prime mover throttle setting to urge said pilot valve in the opposite direction to a position to effect shifting of the transmission ratio in the opposite direction, a bypass valve for interconnecting the pressure and return conduits of the hydrostatic pump and motor unit, a pressure amplifying valve, means connecting the pressure output of said governor to the input of said amplifying valve, and means connecting the output of said amplifying valve to said bypass valve to thereby cause said bypass valve to operate to gradually close whereby the hydrostatic motor is gradually operatively connected to the pump producing smooth take-up of load by the prime mover.

References Cited in the file of this patent

UNITED STATES PATENTS

| | | |
|---|---|---|
| 2,972,224 | Forster | Feb. 21, 1961 |
| 3,036,426 | Brueder | May 29, 1962 |